(12) United States Patent
Carmody et al.

(10) Patent No.: US 8,073,883 B2
(45) Date of Patent: *Dec. 6, 2011

(54) METHODS AND APPARATUS FOR CONCURRENTLY EXECUTING A GARBAGE COLLECTION PROCESS DURING EXECUTION OF A PRIMARY APPLICATION PROGRAM

(75) Inventors: Michael James Carmody, Waterloo (CA); Anthony Fabian Scian, Waterloo (CA); John Fredric Arthur Dahms, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/910,134

(22) Filed: Oct. 22, 2010

(65) Prior Publication Data

US 2011/0041137 A1  Feb. 17, 2011

Related U.S. Application Data

(63) Continuation of application No. 11/552,052, filed on Oct. 23, 2006, now Pat. No. 7,840,612.

(51) Int. Cl.
*G06F 12/00* (2006.01)
(52) U.S. Cl. ........................................ 707/813
(58) Field of Classification Search .................. None
See application file for complete search history.

(56) References Cited

U.S. PATENT DOCUMENTS

| | | | |
|---|---|---|---|
| 5,845,298 A | 12/1998 | O'Connor et al. | |
| 5,930,807 A | 7/1999 | Ebrahim et al. | |
| 6,339,779 B1 | 1/2002 | Houldsworth | |
| 6,349,314 B1 | 2/2002 | Patel | |

(Continued)

FOREIGN PATENT DOCUMENTS

| | | |
|---|---|---|
| EP | 1569108 A1 | 8/2005 |
| EP | 1785873 A1 | 5/2007 |

OTHER PUBLICATIONS

European Search Report & Written Opinion for EP Application # 06122771.6, Mar. 16, 2007.

(Continued)

*Primary Examiner* — Neveen Abel-Jalil
*Assistant Examiner* — Kellye D Buckingham
(74) *Attorney, Agent, or Firm* — John J. Oskorep, Esq.

(57) ABSTRACT

A wireless mobile communication device has an application program and a garbage collection program stored in memory. The garbage collection program is configured to identify a root set of referenced objects of the application program with use of a reference indicator array and to perform a mark and sweep process based on the root set of referenced objects. The reference indicator array has a plurality of reference indicators where each referenced indicator corresponding to a referenced object is set as referenced. The application program is configured to be executed during execution of a mark and sweep process of the garbage collection program, such that information received or provided via the user interface during the execution of the mark and sweep process is received or provided without suspension or delay. The application program has computer instructions which are based on an instruction set defined by a plurality of opcodes or native codes, including a single predefined opcode or a single predefined native code which is a "get object reference" instruction. Each "get object reference" instruction is associated with a target object and is defined to retrieve a reference from the target object and also set one of the reference indicators corresponding to the target object as referenced in the reference indicator array.

20 Claims, 6 Drawing Sheets

U.S. PATENT DOCUMENTS

| | | | |
|---|---|---|---|
| 6,446,257 | B1 | 9/2002 | Pradhan et al. |
| 6,804,762 | B1 | 10/2004 | Dussud et al. |
| 6,907,437 | B1 | 6/2005 | Trotter |
| 7,483,930 | B1 | 1/2009 | Wright et al. |
| 7,555,619 | B2 | 6/2009 | Harris |
| 2004/0248612 | A1 | 12/2004 | Lee et al. |
| 2005/0129235 | A1* | 6/2005 | Little et al. .................. 380/255 |
| 2005/0198088 | A1* | 9/2005 | Subramoney et al. ........ 707/206 |

OTHER PUBLICATIONS

Printezis et al., "A Generational Mostly-Concurrent Garbage Collector", Proceedings of the 2nd international symposium on memory management, Jun. 2000, pp. 1-12.

Barabash et al., "Mostly Concurrent Garbage Collection Revisted", Oct. 26, 2003, pp. 1-14.

Blackburn et al., "Starting With Termination: A Methodology for Building Distributed Garbage Collection Algorithms", Computer Science Conference, Jan. 29, 2001, pp. 20-28, vol. XP010534687.

Duan, Qingfeng, "A Tool for Monitoring and Recording Heap-Allocated Object Behavior", http://www.cs.unm.edu/~darko/papers/duan-ms-thesis.pdf, May 2003, pp. 1-76.

Eddon et al., "Myrrh: A Transaction-Based Model for Autonomic Recovery", 2nd International Conference on Autonomic Computing, pp. 1-11, Jun. 13, 2005.

Smith et al., "Experiences With Retargeting the Java HotSpot(tm) Virtual Machine", International Parallel and Distributed Processing Symposium, pp. 1-9, Aug. 7, 2002, http://ieeexplore.ieee.org/stamp/stamp.jsp?tp=&arnumber=1016507&isnumber=21854.

"AngelScript Change Log", Apr. 3, 2005, vol. 2.1.0, http://www.angelcode.com/angelscript/sdk/docs/articles/changes2.html.

Boehm et al., "Mostly Parallel Garbage Collection", ACM SIGPLAN 1991 Conference on Programming Language Design And Implementation, 1991, pp. 157-164.

\* cited by examiner

METHODS AND APPARATUS FOR CONCURRENTLY EXECUTING A GARBAGE COLLECTION PROCESS DURING EXECUTION OF A PRIMARY APPLICATION PROGRAM

CROSS-REFERENCE TO RELATED APPLICATION

The present application is a continuation of and claims priority to U.S. non-provisional patent application having application Ser. No. 11/552,052 and filing date of 23 Oct. 2006, which is hereby incorporated by reference herein.

BACKGROUND

1. Field of the Technology

The present disclosure relates generally to computer devices having application programs which utilize "garbage collection" processes, and more particularly to concurrent execution of a garbage collection process during the execution of an application program.

2. Description of the Related Art

A computer device, such as a mobile communication device operating in a wireless communication network, may provide communications (e.g. voice telephony and data packet communications) for an end user. The device may further have an application program which is stored in its memory and executed by one or more processors (e.g. a microprocessor). The application program may help provide the device with user interface functionality, for example. The application program may be, for example, an e-mail application program which provides the end user with user interface functionality for reading and authoring e-mail messages from the device.

The application program may be written in any suitable programming language, such as JAVA® programming language. JAVA® is a registered trademark of Sun Microsystems, Inc. A JAVA virtual machine (JVM) is the component of JAVA technology that is responsible for independence between the hardware and operating system, the small size of compiled JAVA code, and the ability to protect users from malicious programs. The JVM is an abstract computing machine. Like a real computing machine, the JVM has an instruction set and manipulates various memory areas at run time.

A "heap" of the JVM stores all objects created by the JAVA application program. Objects are created by JAVA's new operator and memory space for new objects is allocated on the heap at run time. In general, a conventional "garbage collection" process is a JAVA process which automatically frees objects that are no longer referenced by an application program. When an object is no longer referenced by an application program, the heap space that the object occupies is effectively released or recycled so that the space can be made available for subsequently-produced objects. The garbage collector must determine which objects are no longer referenced by the application program and make available the heap space occupied by such unreferenced objects. There are many ways in which to implement garbage collection processes and such techniques are well-documented and publicly available.

The garbage collection process frees one from having to keep track of when to free allocated memory, which prevents many potential application bugs and hardships. However, garbage collection processes are processor-intensive and require that the application program be temporarily suspended. The garbage collection process may take a relatively long time to complete as well. This interferes with use of the device, especially when the need for communications by the end user may be critical.

Accordingly, what are needed are methods and apparatus for use in controlling garbage collection processes in computer devices such as mobile communication devices.

BRIEF DESCRIPTION OF THE DRAWINGS

Embodiments of present disclosure will now be described by way of example with reference to attached figures, wherein.

DETAILED DESCRIPTION OF THE PREFERRED EMBODIMENTS

Figure 1:
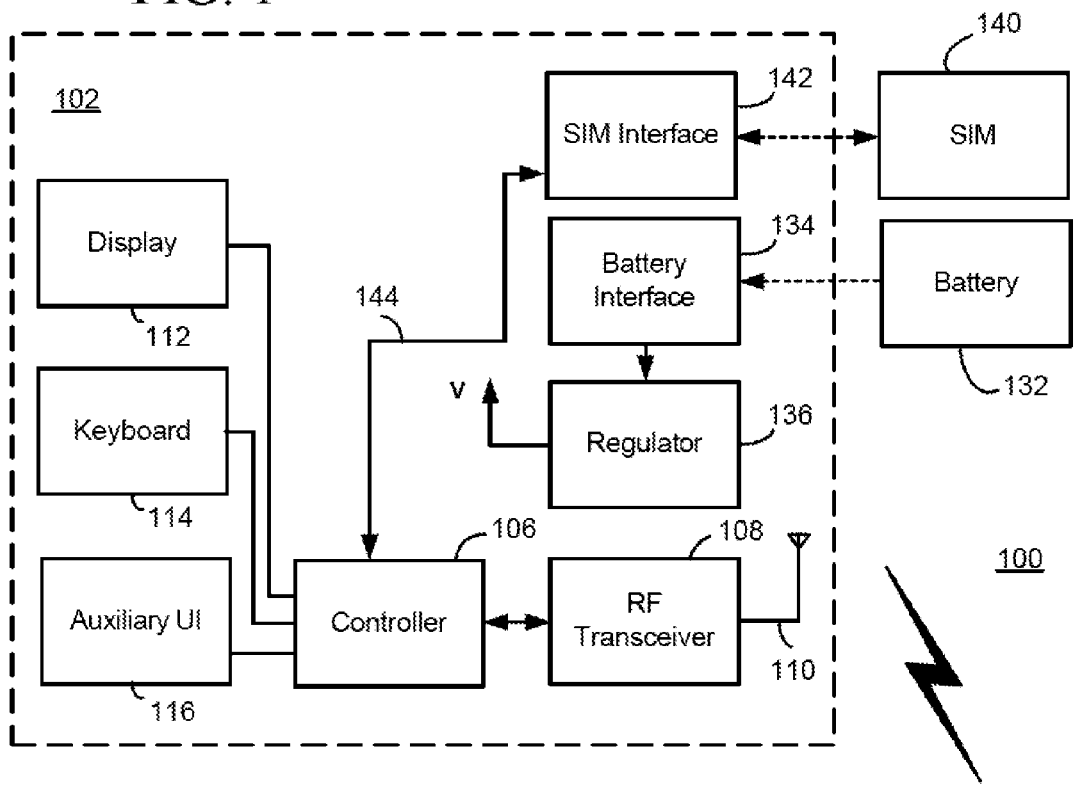
FIG. 1 is a block diagram which illustrates pertinent components of a mobile station and a wireless communication network.
Figure 1:
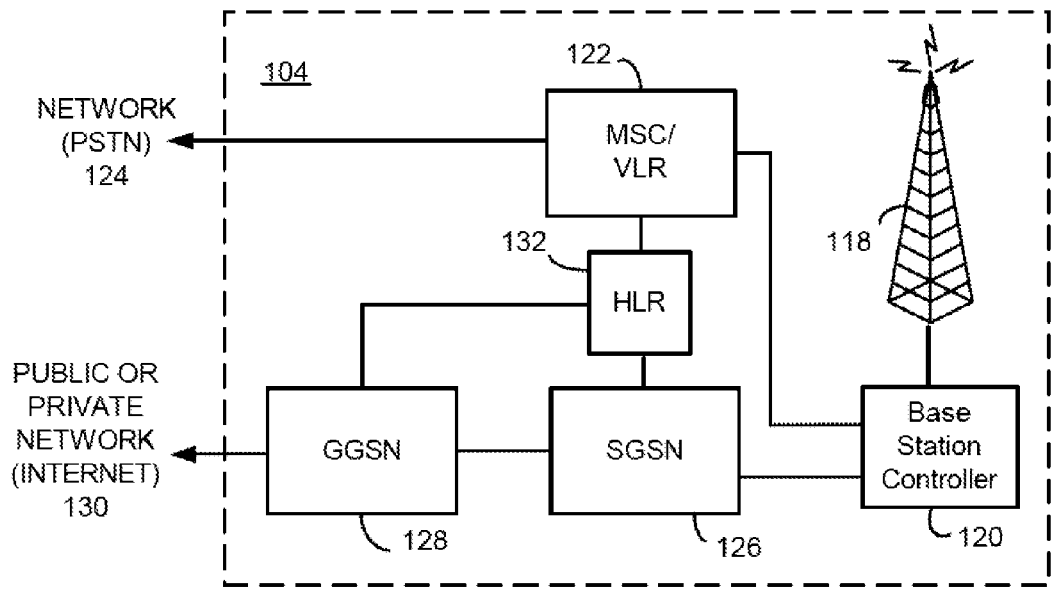

As described herein, one or more processors of a computer device (e.g. a mobile communication device) are operative to execute a garbage collection program and an application program concurrently with execution of the garbage collection program. The garbage collection program is operative to identify a root set of referenced objects of an application program, where a reference indicator in a reference indicator array is set as referenced for each one of such referenced objects, and to perform a mark and sweep process based on the root set of referenced objects. The application program has computer instructions which include a predefined computer instruction (e.g. a GETREF instruction) adapted to retrieve a reference from a target object as well as to set a reference indicator in the reference indicator array as referenced for the target object when executed. Advantageously, execution of the application program need not be unreasonably suspended during garbage collection processes.

According to the present techniques, a garbage collection program is adapted to identify a root set of referenced objects of an application program and to perform a mark and sweep process based on the root set of referenced objects. For each referenced object in the root set, a reference indicator corresponding to the referenced object in a reference indicator array is set as referenced. The mark and sweep process is adapted to, for each referenced object having a reference indicator set as referenced in the reference indicator array, set a marked indicator in a marked indicator array as marked for the referenced object, examine a content of the referenced object for a referenced object, and set a reference indicator in the reference indicator array as referenced for each one of any such referenced objects referenced in the content of the referenced object.

In order to allow concurrent execution of the application program during the mark and sweep process, a new or modified type of computer instruction(s) or opcode(s) are introduced for use in the application program. In particular, a predefined computer instruction referred to as "GETREF" is made available which operates not only to retrieve a reference from a target object when executed, but also to set a reference indicator in the reference indicator array as referenced for the target object. In addition, a predefined computer instruction referred to as "NEW" or "CREATE" is made available which operates to not only create a new object in the application program when executed, but also to set a reference indicator in the reference indicator array as referenced and set a marked indicator in the marked indicator array as marked for the new object. Such predefined computer instructions or operations are used to replace each instance of conventional instructions or operations of the same or similar type. Thus, the application program has computer instructions which interact with the arrays of the garbage collection program, so that used objects of the application program will never be wrongfully destroyed.

To illustrate the problem and solution, the following portion of computer instructions of an application program is utilized as an example:

```
class A {int y... B x; ...}
foo( A p )
{
    B k;
    ...
    ...
    k = p.x; /* k now has a reference to the object m */
    p.x = null;
    k.y = ...
}
```

Given the above, suppose that an object p is defined as class A that references object m of class B in field x. Execution of the application program is allowed to run concurrently during execution of the garbage collection program. Suppose also that p is in the set of referenced objects but is unmarked; that is, the contents of p have not yet been examined by the garbage collection program.

A conventional "GETFIELD x" operation on object p will retrieve the reference to m, which is followed by a conventional "PUTFIELD x" operation with the value of "null" into the object p. Due to execution of these operations, p no longer has a reference to m at field x. Thus, when the object p gets marked during the mark and sweep process of the garbage collection program, it will not have a reference to m. From the perspective of the garbage collection program, the object m will appear to be "dead" and will therefore be destroyed; m, however, is still being utilized by the application program. This example illustrates why an application program is not traditionally executed concurrently with a garbage collection program.

The application program includes a plurality of instructions/operations of various different types, as is conventional. To overcome the issues above, however, the conventional "GETFIELD x" operation is replaced with a "GETREF x" operation. The "GETREF x" operation is adapted to not only retrieve a reference from a target object when executed, but also to set a reference indicator in the reference indicator array as referenced for the target object. Similarly, any conventional "AALOAD" operations are replaced with a modified "AALOAD" operation which is adapted to not only retrieve a reference from a target object of an array when executed, but also to set a reference indicator in the reference indicator array as referenced for the target object. Further, any conventional "NEW" or "CREATE" operations are replaced with a modified "NEW" or "CREATE" operation which is adapted to not only create a new object in the application program when executed, but also to set a reference indicator in the reference indicator array as referenced and set a marked indicator in the marked indicator array as marked for the new object. Although such new or modified instructions or operations are provided, conventional instructions or operations which may be used to modify or manipulate references in objects (e.g. a PUTFIELD instruction) are still available and provided as needed.

Such a new or modified instruction or operation may be or include an explicit opcode associated with the processor, or native methods that have the same effect. Thus, these new or modified instructions or operations may be provided in the application program via a compiler used with the initial source code associated with the application. Thus, such instructions or operations may be derived from the source code of the original application program by the compiler even though they may not be explicitly found in the source code.

Advantageously, execution of the application program need not be unreasonably suspended during garbage collection processes. When the application program is adapted to receive and/or provide information via a user interface of the computer device, such concurrent processing allows for the receiving and/or providing of the information via the user interface without interference (e.g. suspension or delay) during the mark and sweep process. As will be apparent, the techniques of the present disclosure operate in a conservative fashion. In particular, the present techniques may incorrectly identify some "dead" objects as "live", but this result is better than incorrectly identifying some "live" objects as "dead."

To illustrate one exemplary environment, FIG. 1 is a block diagram of a communication system 100 which includes a mobile station 102 (one type of computer device or mobile communication device) which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and BSC 120, including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 134 provides for a mechanical and electrical connection for battery 132. Battery interface 134 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 402 of FIG. 2.

Mobile station 102 communicates in and through wireless communication network 104. Wireless communication network 104 may be a cellular telecommunications network. In the embodiment of FIG. 1, wireless network 104 is configured in accordance with General Packet Radio Service (GPRS) and a Global Systems for Mobile (GSM) technologies. Wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
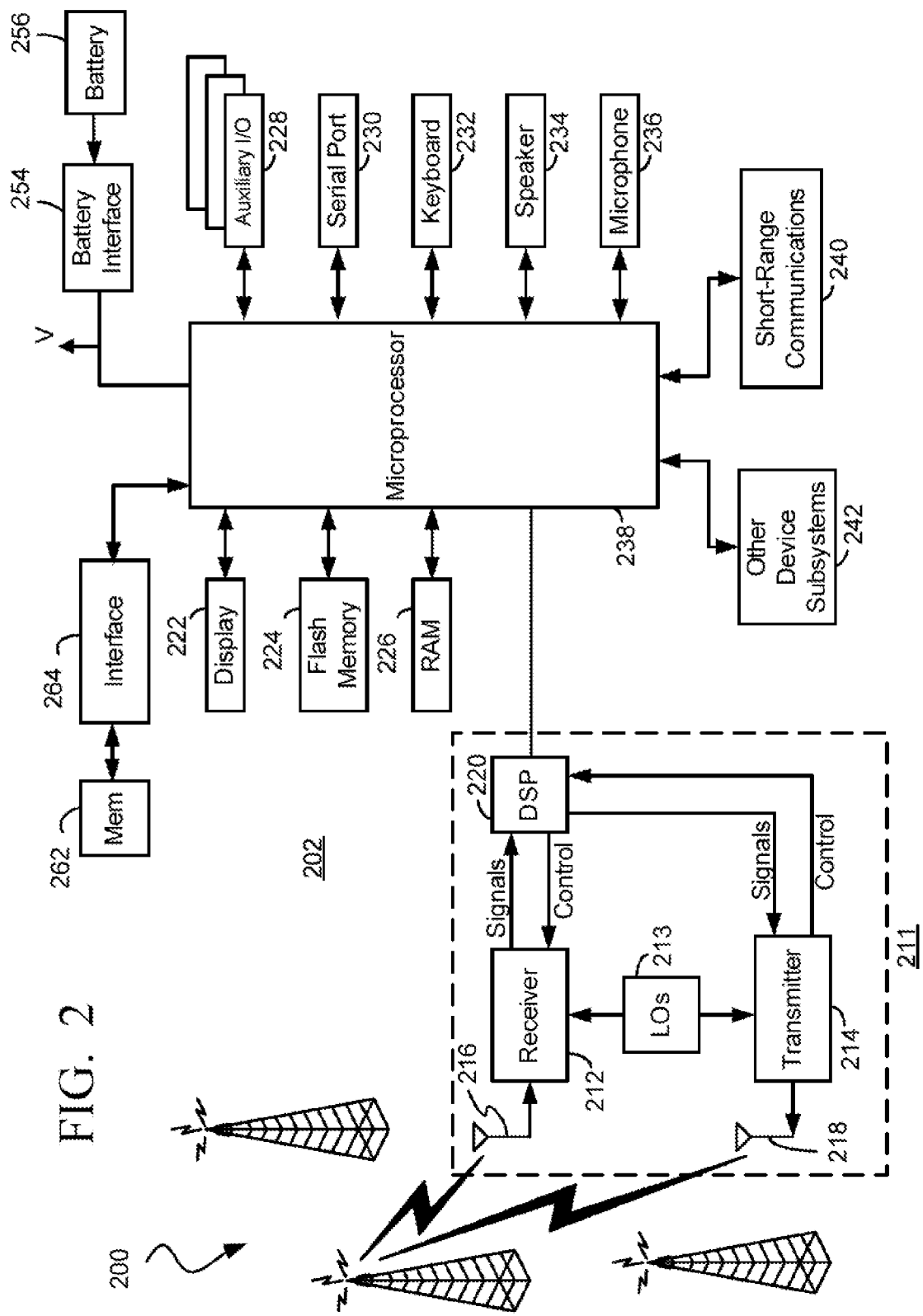
FIG. 2 is a more detailed diagram of a preferred mobile station of FIG. 1.

FIG. 2 is a detailed block diagram of a preferred mobile station 202 of the present disclosure. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOS) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, as well as techniques of the present disclosure, will normally be installed on mobile station 202 during its manufacture. At least one application program, which may be an e-mail application program, is a garbage-collection type program such as a JAVA® program. A preferred application that may be loaded onto mobile station 202 may be a personal information manager (PIM) application having the ability to organize and manage data items relating to user such as, but not limited to, e-mail, calendar events, voice mails, appointments, and task items.

Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

According to the present disclosure, the mobile station has an application program which is stored in its memory (e.g. flash memory 224 of FIG. 2) and executed by one or more processors (e.g. microprocessor 238 of FIG. 2). The application program helps provide the mobile station with user interface functionality for communications. The application program may be, for example, an e-mail application program which provides the end user with user interface functionality for reading and authoring e-mail messages. The application program may be written in any suitable programming language, such as JAVA® programming language. JAVA® is a registered trademark of Sun Microsystems, Inc.

A JAVA virtual machine (JVM) is the component of JAVA technology that is responsible for independence between the hardware and operating system, the small size of compiled JAVA code, and the ability to protect users from malicious programs. The JVM is an abstract computing machine. Like a real computing machine, the JVM has an instruction set and manipulates various memory areas at run time. A "heap" of the JVM stores all objects created by the JAVA application program. Objects are created by JAVA's new operator and memory space for new objects is allocated on the heap at run time. "Garbage collection" is a JAVA process which automatically frees objects that are no longer referenced by an application program. When an object is no longer referenced by an application program, the heap space that the object occupies is effectively released or recycled so that the space can be made available for subsequently-produced objects. The garbage collector must determine which objects are no longer referenced by the application program and make available the heap space occupied by such unreferenced objects. There are many ways in which to implement garbage collection processes, and such techniques are well-documented and publicly available.

Figure 3:
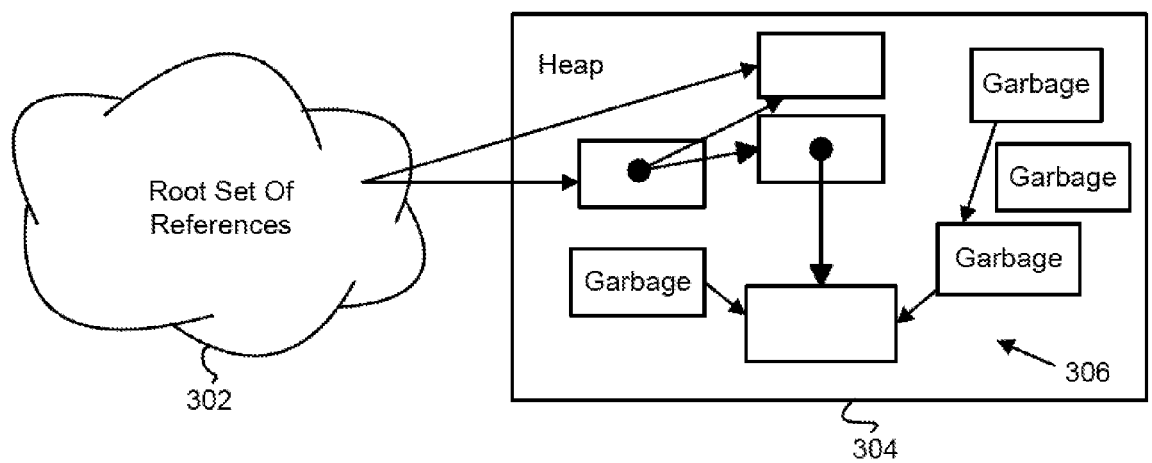
FIG. 3 is an illustration depicting part of a garbage collection process of an application program of the mobile station, revealing that reachable objects are identified and unreachable objects of the application program are freed to reclaim memory space in the memory.
Figure 4:
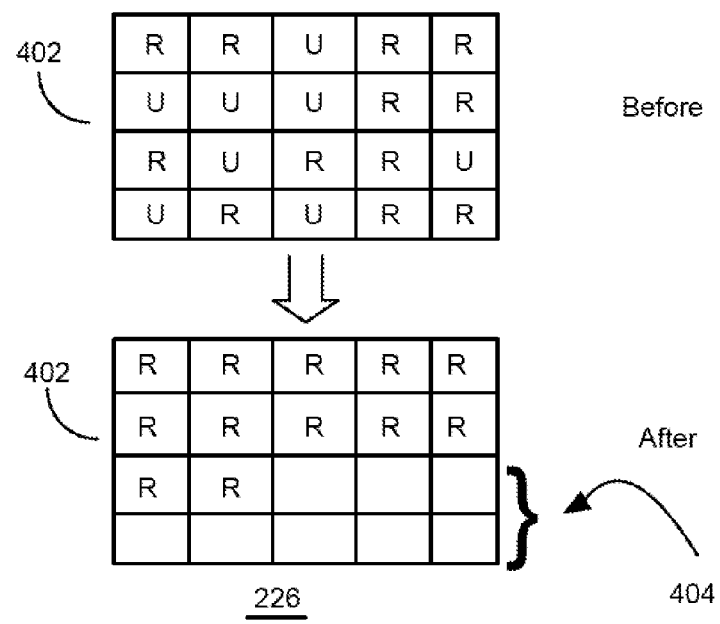
FIG. 4 is another illustration depicting part of the garbage collection process, revealing that the reachable objects of the application program are consolidated so as to increase available contiguous memory space in the memory.

FIG. 3 is an illustration depicting part of a garbage collection process for an application program of the mobile station. The application program has a root set of references 302 to a plurality of objects 306 of a heap 304 in memory (e.g. random access memory or RAM 226 of FIG. 2). In the garbage collection process, reachable objects are identified and unreachable objects of the application program (named "garbage" in FIG. 3) are freed to reclaim memory space in memory. FIG. 4 is another illustration depicting part of the garbage collection process, where a memory space 402 of memory 226 is shown before and after the garbage collection process. After unreachable objects (labeled "U" in FIG. 4) are freed, reachable objects (labeled "R" in FIG. 4) of the application program are consolidated so as to increase an available contiguous memory space 404 in memory 226.

Thus, the garbage collection process frees one from having to keep track of when to free allocated memory, which prevents many potential application bugs and hardships. However, garbage collection processes are processor-intensive and traditionally require that the application program be temporarily suspended. Such garbage collection process may take a relatively long time to complete as well. This interferes with use of the computer device (e.g. a mobile station), especially when the need for communications by the end user may be critical.

The concurrent processing techniques of the present disclosure for garbage collection resolve several issues of the prior art. As described earlier above, a garbage collection program of the present disclosure utilizes two arrays: a reference indicator array and a marked indicator array. The garbage collection program is adapted to identify a root set of referenced objects of an application program and to perform a mark and sweep process based on the root set of referenced objects. For the root set of referenced objects, a reference indicator corresponding to a referenced object in the reference indicator array is set as referenced for each one of such referenced objects. The mark and sweep process is adapted to, for each referenced object having a reference indicator set as referenced in the reference indicator array, set a marked indicator in the marked indicator array as marked for the referenced object, examine a content of the referenced object for a referenced object, and set a reference indicator in the reference indicator array as referenced for each one of any such referenced objects referenced in the content of the referenced object.

In order to allow concurrent execution of the application program during the mark and sweep process, a new or modified type of computer instruction(s) or opcode(s) is introduced for use in the application program. More particularly, a predefined computer instruction referred to as "GETREF" is made available which operates not only to retrieve a reference from a target object when executed, but also to set a reference indicator in the reference indicator array as referenced for the target object. Similarly, a predefined computer instruction referred to as "AALOAD" is made available which operates not only to retrieve a reference from a target object of an array when executed, but also to set a reference indicator in the reference indicator array as referenced for the target object. Further, a predefined computer instruction referred to as "NEW" or "CREATE" is made available which operates to not only create a new object in the application program when executed, but also to set a reference indicator in the reference indicator array as referenced and set a marked indicator in the marked indicator array as marked for the new object. Such new or modified instructions or operations are used to replace each instance of conventional instructions or operations of the same or similar type. Thus, the application program has computer instructions which interact with the arrays of the garbage collection program, so that used objects of the application program will never be wrongfully destroyed.

Such a new or modified instruction or operation may be an explicit opcode associated with the processor or native methods that have the same effect. These new or modified instructions or operations may be provided in the application program via a compiler used with the initial source code associated with the application. Thus, such instructions or operations may be derived from the source code of the original application program by the compiler even though they may not be explicitly found in the source code.

For example, consider the following JAVA source code of the application program:

C=A.B

In this case, a conventional compiling technique for the JAVA source code may create the following machine code or opcode sequence:

PUSH A
GETFIELD B
STORE C

On the other hand, a compiling technique for the JAVA source code which provides compatibility with the present inventive techniques may result in the following machine code or opcode sequence:

PUSH A
GETREF B
STORE C

As apparent, the new or modified instruction(s) or operation(s) may be derived from the original source code of the application program from the compiler, and/or provided internally within processing of the processor.

The rationale underlying the inventive techniques is that, at the time of collecting the root set of referenced objects, the target object of the GETREF instruction must have been active or it would not have been accessible during execution. If the reference in the target object of the GETREF instruction is changed by a subsequent PUTFIELD instruction, for example, then the reference will be obscured to the mark and sweep process but still possibly be active from execution of the GETREF instruction as either a new root or stored into another object. As will be apparent, the techniques of the present disclosure operate in a conservative fashion in that they may incorrectly identify some "dead" objects as "live" (and refraining from deleting such "dead" objects), which is better than incorrectly identifying some "live" objects as "dead" (and deleting such objects).

Advantageously, execution of the application program need not be unreasonably suspended during garbage collection processes. When the application program is adapted to receive and/or provide information via a user interface of the computer device (see e.g. keyboard 114 and display 112 of FIG. 1, and keyboard 232 and display 222 of FIG. 2), such concurrent processing allows for the receiving and/or providing of the information via the user interface without interference (e.g. suspension or delay) during the mark and sweep process.

Figure 5A:
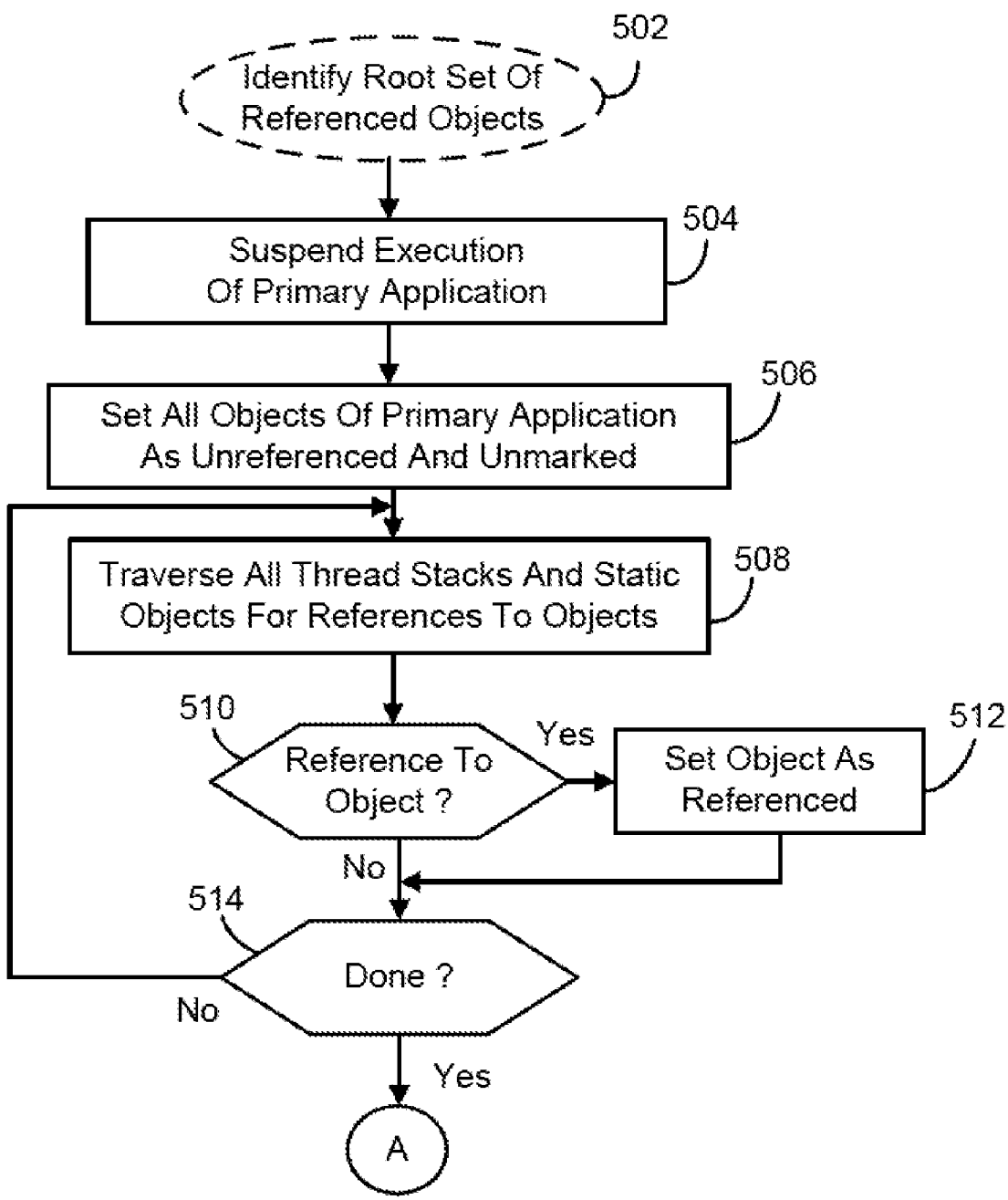
FIGS. 5A and 5B form a flowchart for describing a method of concurrently executing a garbage collection process during the execution of a primary application program of a computer device.
Figure 5B:
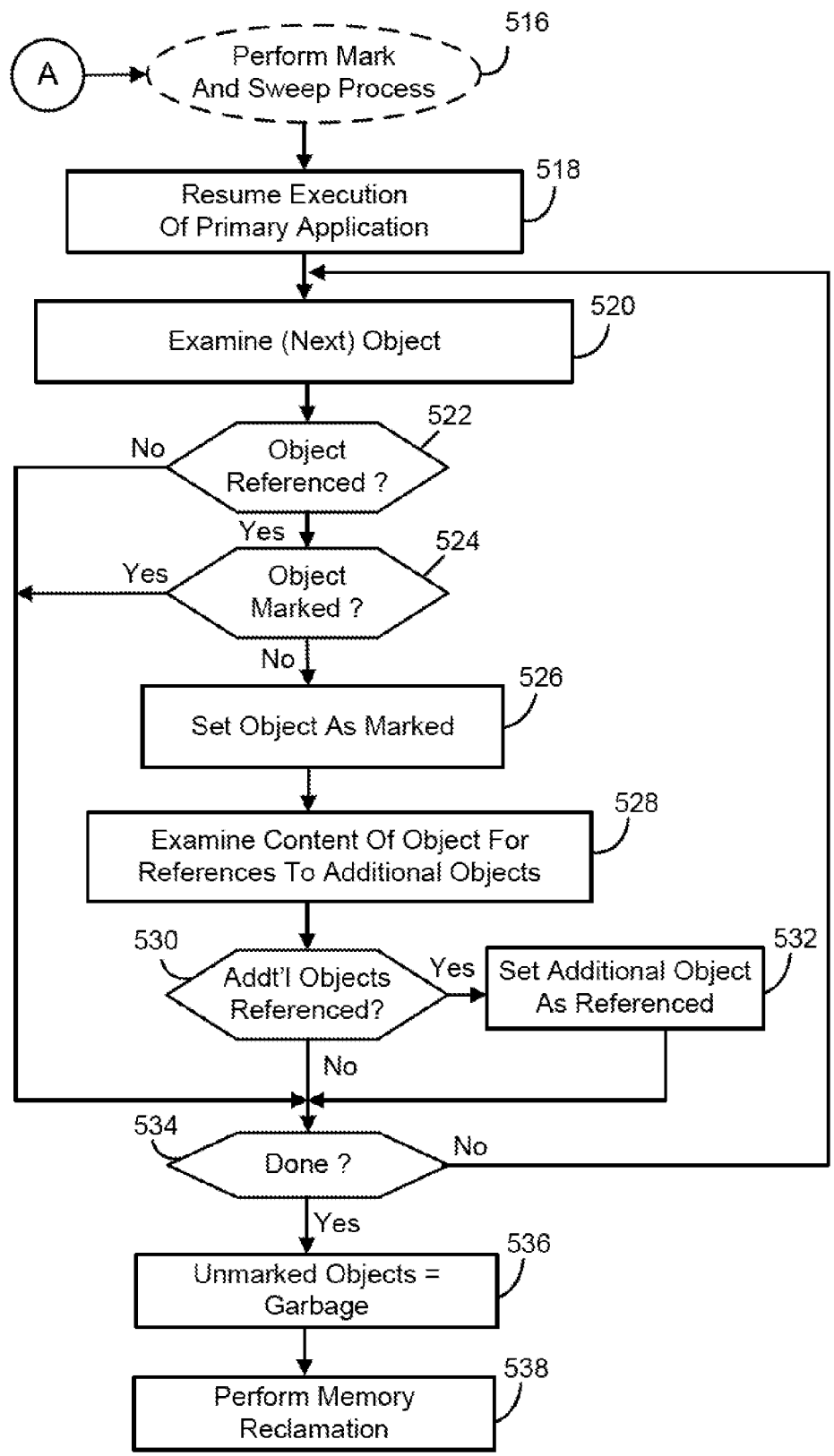
Figure 6:
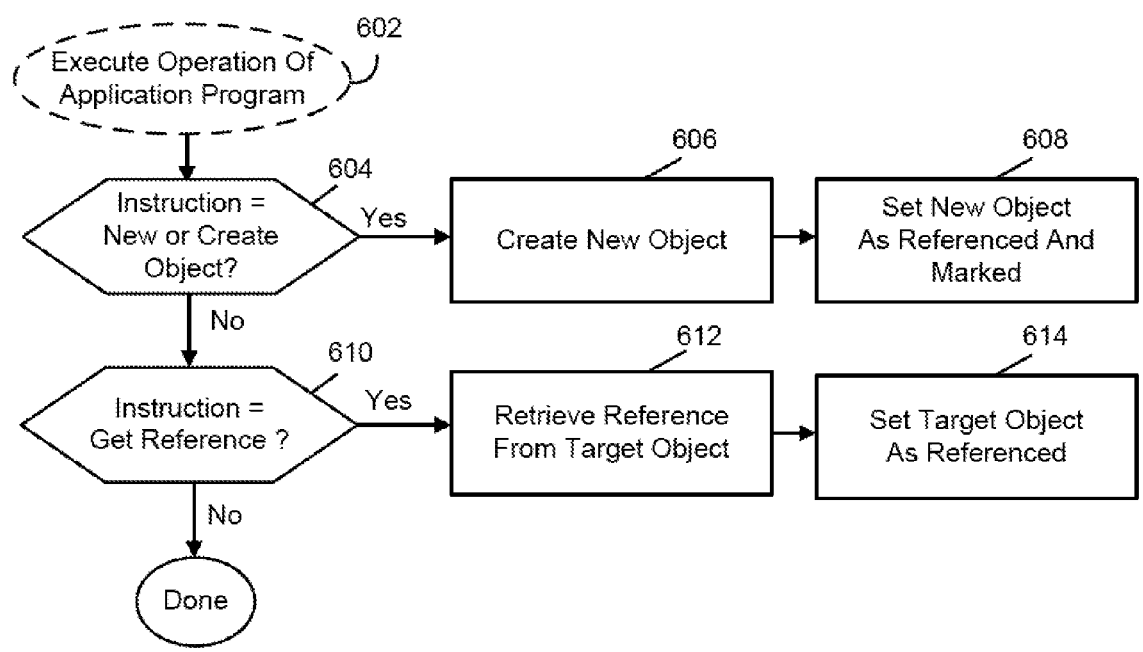
FIG. 6 is a flowchart for describing a pertinent technique in the execution of the primary application program of the method of FIGS. 5A and 5B.

FIGS. 5A, 5B, and 6 are flowcharts for describing a method for use in concurrently executing a garbage collection process during execution of a primary application program of a computer device. The method of FIGS. 5A-5B relates to techniques utilized in a garbage collection program of the computer device, and the method of FIG. 6 relates to techniques utilized in a primary application program of the computer device. The method is executed by one or more processors of the computer device (e.g. see controller 106 of FIG. 1 or microprocessor 238 of FIG. 2), where the programs are stored in memory of the computer device (e.g. see memory 224 or 226 of FIG. 2). A computer program product of the present disclosure may include a computer readable medium and computer instructions stored in the computer readable medium which are executable by the one or more processors to perform the method.

Some preliminary operations associated with the computer device are first described. In response to a power on event of the computer device, an initialization procedure is performed and a primary application program for the computer device is started. The application program, which may be an e-mail application program, is a garbage-collection type program such as a JAVA® program which utilizes JVM. In the present embodiment, the computer device is a mobile communication device, and therefore, a radio communication program for receiving messages and communications via radio communications (separate and apart from the application program) is also started and runs independently from the application program. Communication operation of the mobile communication device (e.g. voice telephony and/or e-mail operation) is thereby enabled and active, where the mobile communication device may or may not be actively engaged in voice or data call. The application program is then placed into a sleep mode where subsequent application processes are event-driven. In response to a detected event at the computer device, the application program is exited from the sleep mode and resumed to process the event. An event may be, for example, a user interface signal detection or a page message for a voice call received through the wireless transceiver.

While the application program is running, objects are created by the application program and stored in memory. During this time, the computer device may identify whether a predetermined "garbage collection" condition is detected or identified. This predetermined condition may be, for example, a memory allocation failure where the application program attempts to allocate memory space during processing of the event but there is no available memory to do so. Another predetermined condition may be, for example, an expiration of a period of time. If the predetermined condition is identified, then a garbage collection process is started. As described above in relation to FIGS. 3-4, the garbage collection process involves freeing unreachable objects of the application program to reclaim memory space and consolidating reachable objects of the application program so as to increase available contiguous memory space.

Referring now to FIG. 5A, the first phase of the garbage collection program relates to identifying the root set of referenced objects of the application program (see a flowchart introduction indicator 502 of FIG. 5A), executed in steps 504-514 of FIG. 5A that follow. First, the application program is suspended (step 504 of FIG. 5A). The garbage collection program then initializes a reference indicator array and a marked indicator array for objects of the application program. More particularly, the garbage collection program sets each reference indicator for each object in the reference indicator array as "unreferenced," and sets each marked indicator for each object in the marked indicator array as "unmarked" (step 506 of FIG. 5A). The garbage collection program then traverses all thread stacks and static objects of the application program for references to objects (step 508 of FIG. 5A). With respect to a given object, the garbage collection program tests whether there is a reference to an object (tested in step 510 of FIG. 5A). If there is a reference to an object as identified in step 510, then the garbage collection program sets the reference indicator for the object in the reference indicator array as "referenced" (step 512 of FIG. 5A). If there is no reference to the object as identified in step 510, then the garbage collection program skips step 512 and continues to step 514 of FIG. 5A. If there are more relevant objects to test (as tested in step 514 of FIG. 5A), then the garbage collection program continues traversing and identifying references to (next) objects of the application program in steps 508, 510, 512, and 514. When there are no more relevant objects to test as identified in step 514, the result is that a root set of referenced objects have been identified, as provided in the reference indicator array. Once this root set of referenced objects are identified, processing for the garbage collection program continues through a connector A in FIG. 5A which leads to FIG. 5B.

Referring now to FIG. 5B, the second phase of the garbage collection program relates to performing a mark and sweep process based on the root set of referenced objects obtained in the first phase (see flowchart introduction indicator 516 of FIG. 5B), executed in the steps that follow. First, the application program that was temporarily suspended during the first phase of the garbage collection program is now resumed (step 518 of FIG. 5B). Therefore, the current mark and sweep process will run concurrently with the resumed execution of the application program (in parallel). The garbage collection program proceeds to examine an object based on the reference indicator array and/or the marked indicator array (step 520 of FIG. 5B). More particularly, the garbage collection program identifies whether the object is referenced, where the referenced indicator for the object is set as "referenced" in the reference indicator array (step 522 of FIG. 5B). If the object is set as "referenced," then the garbage collection program proceeds to identify whether the object is marked based on the marked indicator array (step 524 of FIG. 5B). If the object is marked, where the marked indicator for the object is set as "marked" as identified in step 524, then processing continues at step 526 of FIG. 5B. If the object is set as "unreferenced" in step 522, or set as "unmarked" in step 524, processing continues at step 534 of FIG. 5B.

If the object is identified as unmarked in step 524, then garbage collection program sets the object as "marked" in the marked indicator array (step 526 of FIG. 5B). Next, the garbage collection program examines a content of the marked object for references to additional objects (step 528 of FIG. 5B). If there are additional objects referenced in the content of the object (as tested in step 530 of FIG. 5B), then the garbage collection program sets the additional object as "referenced" in the reference indicator array (step 532 of FIG. 5B). If there are no additional objects referenced in the content of the object in step 530, then no additional objects are set as referenced for that object. The garbage collection program then identifies whether it is done at step 534 of FIG. 5B; this condition is present when no referenced objects in the reference indicator array are unmarked. When it is done in step 534, processing proceeds to step 536 of FIG. 5B; otherwise processing continues again back at step 520 for the next object under consideration.

When the iterative processing of the flowchart has been completed as identified in step 534, the garbage collection program identifies and deems all objects that are unmarked (i.e. set as "unmarked" in the marked indicator array) as "garbage" (step 536 of FIG. 5B). A memory reclamation process is then performed based on the identification of these "garbage" or "dead" objects and the remaining "live" objects (step 538 of FIG. 5B) utilizing conventional or other suitable techniques. Here, objects identified as garbage are freed in order to reclaim memory space in memory, and remaining objects are consolidated in the memory such that available contiguous memory space in the memory is increased.

Referring now to FIG. 6, processing associated with execution of the application program is now described (see flowchart introduction indicator 602 of FIG. 6). Such processing may be performed by an interpreter of the processor(s) utilized. In order to allow concurrent execution of the application program during the mark and sweep process, a new or modified type of computer instruction(s) or opcode(s) is introduced for use in the application program. Such new or modified instructions or operations are used to replace each instance of conventional instructions or operations of the same or similar type in the application program. Such a new or modified instruction or operation may be an explicit opcode associated with the processor or native methods that have the same effect. Thus, these new or modified instructions or operations may be provided in the application program via a compiler used with the initial source code associated with the application. Thus, such instructions or operations may be derived from the source code of the original application program by the compiler even though they may not be explicitly found in the source code.

Viewing FIG. 6, if a predefined computer instruction referred to as "NEW" or "CREATE" is encountered (step 604 of FIG. 6), then processing to create a new object in the application program is performed (step 606 of FIG. 6). Further, processing to set a reference indicator in the reference indicator array as referenced for the new object, and to set a marked indicator in the marked indicator array as marked for the new object, is also performed (step 608 of FIG. 6). If "NEW" or "CREATE" is not encountered at step 604, then the computer instruction is of a different type. If a predefined computer instruction referred to as "GETREF" is encountered (step 610 of FIG. 6), then processing to retrieve a reference from a target object in the application program is performed (step 612 of FIG. 6). Further, processing to set a reference indicator in the reference indicator array as referenced for the target object is also performed (step 614 of FIG. 6). Operation of the "AALOAD" instruction may be executed in a similar manner. As apparent, the application program has computer instructions which interact with the arrays of the garbage collection program, so that used objects of the application program will never be wrongfully deleted.

Preferably, the predefined computer instructions (e.g. NEW, GETREF, AALOAD) are further adapted to set the indicator(s) in the indicator array(s) for the object only if the mark and sweep process is currently being executed or in progress. Otherwise, if the mark and sweep process is not currently being executed, the predefined computer instruction is adapted to refrain from setting the indicator in the indicator array for the object. Advantageously, this increases the execution time of the application program. An indicator which indicates whether the mark and sweep process is in progress is set to "in progress" at the initiation of the mark and sweep process in FIG. 5B, and set to "not in progress" at the end of the mark and sweep process in FIG. 5B. The processing associated with FIG. 6 utilizes this indicator in a test step (not shown in FIG. 6) regarding whether to perform steps 608 and 614 (i.e. the setting of the indicators).

Thus, according to the present disclosure, one or more processors of a computer device (e.g. a mobile communication device) are operative to execute a garbage collection program and an application program concurrently with execution of the garbage collection program. The garbage collection program is operative to identify a root set of referenced objects of an application program, where a reference indicator in a reference indicator array is set as referenced for each one of such referenced objects, and to perform a mark and sweep process based on the root set of referenced objects. The application program has computer instructions which includes a predefined computer instruction adapted to retrieve a reference from a target object and to set a reference indicator in the reference indicator array as referenced for the target object when executed. In one illustrative example, the application program is adapted to receive and/or provide information via a user interface of the computer device, and the concurrent processing allows for the receiving and/or providing of the information via the user interface without interference (e.g. suspension or delay) during the mark and sweep process. The method may be embodied as a computer program product which includes a computer readable medium and computer instructions stored on the computer readable medium which are executable by the one or more processors of the computer device.

A computer device (e.g. a mobile communication device) of the present disclosure may include the one or more processors; memory coupled to the one or more processors for storing the application program and the garbage collection program; a transceiver (e.g. an RF or wireless transceiver) coupled to the one or more processors; and a user interface coupled to the one or more processors. Where the application program is adapted to receive and/or provide information via the user interface, the concurrent processing allows for the receiving and/or providing of the information via the user interface without interference (e.g. suspension or delay) during the mark and sweep process.

The above-described embodiments of the present disclosure are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A wireless mobile communication device, comprising:
one or more processors;
a user interface, coupled to the one or more processors, and comprising at least one of a keyboard or a display;
memory coupled to the one or more processors;
an application program, stored in the memory, and configured to receive or provide information via the user interface;
a garbage collection program, stored in the memory, and configured to identify a root set of referenced objects of the application program with use of a reference indicator array and to perform a mark and sweep process based on the root set of referenced objects, the reference indicator array having a plurality of reference indicators where each referenced indicator corresponding to a referenced object is set as referenced; and
the application program being configured to be executed during execution of the mark and sweep process of the garbage collection program, such that information received or provided via the user interface during the execution of the mark and sweep process is received or provided without suspension or delay, the application program being based on an instruction set comprising a predefined opcode or native code which is defined to: (1) retrieve a reference from a target object, and (2) set one of the reference indicators corresponding to the target object as referenced in the reference indicator array.

2. The wireless mobile communication device of claim 1, wherein the application program is derived from a JAVA application program.

3. The wireless mobile communication device of claim 1, comprising a handheld telephony device operative in a wireless communication network.

4. The wireless mobile communication device of claim 1, wherein the predefined opcode or native code is a single predefined opcode of the one or more processors.

5. The wireless mobile communication device of claim 1, wherein the predefined opcode or native code is a single predefined native code.

6. The wireless mobile communication device of claim 1, wherein the predefined opcode or native code comprises a GETREF instruction.

7. The wireless mobile communication device of claim 1, wherein the predefined opcode or native code comprises an AALOAD instruction.

8. The wireless mobile communication device of claim 1, wherein the predefined opcode or native code is further defined to set the reference indicator in the reference indicator array as referenced for the target object if the mark and sweep process is currently being executed, and to refrain from setting the reference indicator in the reference indicator array as referenced for the target object if the mark and sweep process is not currently being executed.

9. The wireless mobile communication device of claim 1, wherein the mark and sweep process is further configured to, for each referenced object having one of the reference indicators set as referenced in the reference indicator array: (1) set a marked indicator in a marked indicator array as marked for the referenced object, (2) examine a content of the referenced object for a further referenced object, and (3) set one of the reference indicators corresponding to said further referenced object as referenced in the reference indicator array.

10. The wireless mobile communication device of claim 1, wherein the mark and sweep process is further configured to, for each referenced object having one of the reference indicators set as referenced in the reference indicator array, (1) set a marked indicator in a marked indicator array as marked for the referenced object, (2) examine a content of the referenced object for a further referenced object, and (3) set one of the reference indicators corresponding to said further referenced object as referenced in the reference indicator array, the garbage collection program being further configured to:

free objects identified as garbage in order to reclaim memory space in memory, the objects identified as garbage being those that fail to have a corresponding one of the marked indicators set as marked in the marked indicator array; and consolidate referenced objects such that available contiguous memory space in the memory is increased.

11. A wireless mobile communication device, comprising:
one or more processors;
a user interface, coupled to the one or more processors, and comprising at least one of a keyboard or a display;
memory coupled to the one or more processors;
an application program, stored in the memory, and configured to receive or provide information via the user interface;
a garbage collection program stored in the memory;
the garbage collection program being configured to identify a root set of referenced objects of the application program with use of a reference indicator array and to perform a mark and sweep process based on the root set of referenced objects, the reference indicator array having a plurality of reference indicators where each referenced indicator corresponding to a referenced object is set as referenced; and
the application program being configured to be executed during execution of the mark and sweep process of the garbage collection program, such that information received or provided via the user interface during the execution of the mark and sweep process is received or provided without suspension or delay, the application program being based on an instruction set comprising a predefined opcode or native code which is defined to: (1) create a new object for the application program, (2) set one of the reference indicators corresponding to the new object as referenced in the reference indicator array, and (3) set one of the marked indicator corresponding to the new object as marked in the marked indicator array.

12. The wireless mobile communication device of claim 11, wherein the application program is derived from a JAVA application program.

13. The wireless mobile communication device of claim 11, comprising a handheld telephony device operative in a wireless communication network.

14. The wireless mobile communication device of claim 11, wherein the predefined opcode or native code is a single predefined opcode of the one or more processors.

15. The wireless mobile communication device of claim 11, wherein the predefined opcode or native code is a single predefined native code.

16. The wireless mobile communication device of claim 11, wherein the predefined opcode or native code is a CREATE instruction.

17. The wireless mobile communication device of claim 11, wherein the predefined opcode or native code is a NEW instruction.

18. The wireless mobile communication device of claim 11, wherein the predefined opcode or native code is further defined to set the reference indicator in the reference indicator array as referenced for the target object if the mark and sweep process is currently being executed, and to refrain from setting the reference indicator in the reference indicator array as referenced for the target object if the mark and sweep process is not currently being executed.

19. The wireless mobile communication device of claim 11, wherein the mark and sweep process is further configured to, for each referenced object having one of the reference indicators set as referenced in the reference indicator array: (1) set a marked indicator in a marked indicator array as marked for the referenced object, (2) examine a content of the referenced object for a further referenced object, and (3) set one of the reference indicators corresponding to said further referenced object as referenced in the reference indicator array.

20. The wireless mobile communication device of claim 11, wherein the mark and sweep process is configured to, for each referenced object having one of the reference indicators set as referenced in the reference indicator array, (1) set a marked indicator in a marked indicator array as marked for the referenced object, (2) examine a content of the referenced object for a further referenced object, and (3) set one of the reference indicators corresponding to said further referenced object as referenced in the reference indicator array, the garbage collection program being further configured to:

free objects identified as garbage in order to reclaim memory space in memory, the objects identified as garbage being those that fail to have a corresponding one of the marked indicators set as marked in the marked indicator array; and consolidate referenced objects such that available ontiguous memory space in the memory is increased.

* * * * *